United States Patent [19]

Somemiya et al.

[11] Patent Number: 5,459,206

[45] Date of Patent: Oct. 17, 1995

[54] TWO-PART ROOM TEMPERATURE CURABLE COMPOSITION

[75] Inventors: Toshio Somemiya, Chiba; Zyunzo Makino, Ohmiya, both of Japan

[73] Assignee: Cemedine Co., Ltd., Tokyo, Japan

[21] Appl. No.: 228,852

[22] Filed: Apr. 18, 1994

Related U.S. Application Data

[63] Continuation-in-part of Ser. No. 34,813, Mar. 19, 1993, abandoned.

[30] Foreign Application Priority Data

Mar. 31, 1992 [JP] Japan ................................ 4-76937
Jan. 18, 1993 [JP] Japan ................................ 5-05755

[51] Int. Cl.$^6$ .................................................. C08G 77/08
[52] U.S. Cl. ........................... 525/479; 526/279; 528/33; 528/12
[58] Field of Search ................ 525/479; 528/12, 528/33; 526/279

[56] References Cited

U.S. PATENT DOCUMENTS 4,746,702  5/1988  Greco et al. ........................ 525/100

*Primary Examiner*—John C. Bleutge
*Assistant Examiner*—Margaret W. Glass
*Attorney, Agent, or Firm*—Nikaido, Marmelstein, Murray & Oram

[57] ABSTRACT

A two-part room temperature curable composition comprising liquid part A containing an organic polymer having reactive silicon groups, and a promoter for the polymerization of a radically-polymerizable monomer as essential components; and liquid part B containing the radically-polymerizable monomer, an initiator for the polymerization of the radically-polymerizable monomer, and an accelerator for the curing of the organic polymer having reactive silicon groups as essential components. The two-part composition can be mixed together at room temperature and has the property of curing rapidly to produce a product with a flexibility equivalent to rubber materials. Thus, when used as a flexible protective coating, potting material, sealing agent or adhesive, this product can reduce working time while guaranteeing high reliability and can prevent pollution of the working environment.

21 Claims, No Drawings

TWO-PART ROOM TEMPERATURE CURABLE COMPOSITION

CROSS-REFERENCE TO RELATED APPLICATION

This application is a continuation-in-part of U.S. application Ser. No. 08/034, 813 filed Mar. 19, 1993, now abandoned.

BACKGROUND OF THE INVENTION

1. Field of the Invention

The present invention relates to a two-part room temperature curable composition which can be used widely in various fields such as adhesives, coating materials, gap-filling materials and casting materials.

2. Description of the Prior Art

As a two-part curable composition, there is known a two-part radically-polymerizable composition mainly containing a radically-polymerizable acrylate (or methacrylate) monomer. Moreover, one part of the known composition further contains organic peroxides as polymerization initiators, while the other part thereof contains, for example, metal chelate compounds, organic amines, carboxylic acids, polyamides, organic phosphorus compounds, thiourea compounds or metal salts, as polymerization accelerator. Generally, such a two-part radically-polymerizable composition is excellent in the rapid curing property and low temperature curing property as well as in the workability. Therefore, if used for adhesion or protective coating of parts or components constructing cars, speakers, small-size motors and other electric machines, the two-part curing composition can be expected to enhance the productivity of these articles.

In most cases, for giving surface-drying ability to the adhesive, a volatile monomer such as methyl methacrylate is used as the radically-polymerizable monomer to be contained mainly in the composition. However, such an acrylate (methacrylate) monomer is extremely hard and presents relatively large curing shrinkage in general.

To improve these drawbacks, various methods have been considered so far, in which for example many kinds of organic polymers (e.g., various synthetic rubbers or synthetic resins) ore added to the composition. However, even in such methods, the above-mentioned problems still remain to be solved. Namely, in case of filling adhesion or in cases where the adhered portion must experience low and high temperature conditions repeatedly, relatively large curing shrinkage still occurs and results in warpage. Thus, the portion to be adhered by such a composition is likely to be worn or broken under such conditions.

Also in the field of epoxy-type curable compositions, there are known methods based on addition of various kinds of rubber or modification of main or side chains of an epoxy compound with urethane or other rubber-related groups in order to make these compositions soft and flexible.

Recently, compositions comprising combination of modified silicone, an epoxy resin and a known epoxy-resin curing agent have been proposed as compositions presenting elasticity virtually equivalent to rubber. The compositions of this type are used for easing warpage or stress of a portion to be adhered by the compositions. Namely, the physical properties of the adhesives are utilized to lessen the stress to be caused by repetition of low and high temperature conditions and therefore to enhance much the reliability or durability of adhesion.

However, though the silicone-epoxy compositions have such excellent properties as mentioned above, the curing rate of the compositions is generally low at ordinary and low temperature conditions. Therefore, such silicone-epoxy compositions must be restricted from use in an assembly line or coating process which requires rapid curing.

SUMMARY OF THE INVENTION

Therefore, it is an object of the present invention to provide a two-part room temperature curable composition which has a rapid curing property substantially equal to that of the above-mentioned acrylate (methacrylate) type polymerizable compositions as well as rubber-like elasticity substantially equivalent to that of the above-described modified silicone-epoxy-type curing composition. Namely, the aim of the present invention is to improve the extremely high hardness of the acrylate (or methacrylate) type polymerizing composition as well as to solve the problem on the low curing rate of the modified silicone-type composition, thereby to obtain a room temperature curing composition having a rapid curing property and rubber-like elasticity.

After various studies on solving these problems of the two-part radically-polymerizable acrylate (or methacrylate) composition and modified silicone type curing composition, the inventors found that a two part room temperature curable composition having a rapid curing property equivalent to that of the acrylate-type composition as well as having rubberlike elasticity substantially equal to that of the modified silicone type composition can be obtained by combining both the two compositions.

Namely, the two part room temperature curable composition of the present invention comprises part liquid A containing an organic polymer having reactive silicon groups and a polymerization accelerator of a radically-polymerizable monomer, as essential components; and part liquid B containing the radically-polymerizable monomer, a polymerization initiator of the radically-polymerizable monomer and a curing accelerator of the organic polymer having reactive silicon groups, as essential components.

Alternatively, each of the polymerization accelerator and polymerization initiator of the radically-polymerizable monomer may be contained either one of part liquids A and B. Thus, it is also possible to blend the polymerization initiator in part liquid a while the polymerization accelerator in part liquid B.

Moreover, it is also possible that both part liquids A and B contain radically-polymerizable monomers. In this case, the kind of combination of the radically-polymerizable monomers in part liquids A and B may be the same or different.

In addition, it is also possible that part liquid A contains an organic polymer having reactive silicon groups, a radically-polymerizable monomer and a polymerization initiator of the radically-polymerizable monomer, as essential components; and other part liquid B contains a curing accelerator of the organic polymer having reactive silicon groups and a polymerization accelerator of the radically-polymerizable monomer, as essential components.

Also in this combination, each of the polymerization accelerator and polymerization initiator of the radically-polymerizable monomer may be contained in either one of part liquids A and B. Thus, it is also possible to blend the initiator in part liquid A while the accelerator in part liquid B.

Furthermore, it is also possible that only the polymerization accelerator of the radically-polymerizable monomer is contained in part liquid B, and all the rest of the above-described components are contained in liquid part A. Alternatively, part liquid B may be used as a curing-accelerator primer to use this system as a honeymoon-type adhesive.

Incidentally, there is no specific range on the blending ratio between part liquids A and B. Thus, it is possible to adopt any blending ratio of these part liquids if the effect of the present invention can be guaranteed.

The part liquid A and part liquid B are maintained at temperatures prior to admixture with each other such that the radically-polymerizable monomer does not polymerize, and the reactive silicon groups in the organic polymer do not react to any substantial extent prior to their admixture, and the part liquid A and part liquid B react together to directly form a cured product. The reaction between the liquid parts A and B may be carried out at about room temperature.

The radically-polymerizable monomer used in the present invention is a radically-polymerizable monomer mainly containing acrylate and/or methacrylate, and the acrylate (methacrylate) includes alkyl-type or substituted-alkyl-type monofunctional acrylates (methacrylates), such as methyl acrylate (methacrylate), ethyl acrylate (methacrylate), stearyl acrylate (methacrylate), benzyl acrylate (methacrylate), isobornyl acrylate (methacrylate), dicyclopentenyl acrylate (methacrylate) and dicyclopentenyloxyethyl acrylate (methacrylate); ether-type monofunctional acrylates (methacrylates), such as methoxyethyl acrylate (methacrylate), methoxydiethylene glycol acrylate (methacrylate) and methoxypolyethylene glycol acryate (methacrylate); alkylene-type bifunctional acrylates (methacrylates), such as ethylene glycol diacrylate (dimethacrylate), 1,3-butylene glycol diacrylate (dimethacrylate) and neopentyl glycol diacrylate (dimethacrylate); ether-type bifunctional acrylates (methacrylates), such as diethylene glycol diacrylate (dimethacrylate), polyethylene glycol diacrylate (dimethacrylate), polypropylene glycol diacrylate (dimethacrylate), triethylene glycol diacrylate (dimethacrylate) and tetraethylene glycol diacrylate (dimethacrylate); trifunctionalacrylates (methacrylates), such as trimethylolpropane triacrylate(trimethacrylate) and trimethylolethane triacrylate (trimethacrylate); multifunctional acrylates (methacrylates), such as pentaerythritol tetraacrylate (tetramethacrylate), dipentaerythritol polyacrylate (polymethacrylate) and tetramethylolmethane tetraacrylate (tetramethacrylate); polar-group-containing or substituting-atom-containing acrylates (methacrylates), such as 2-hydroxy-ethyl acrylate (methacrylate), tetramethylolmethane triacrylate (trimethacrylate), pentaerythritol triacrylate (trimethacrylate), 2,3-dibromopropyl acrylate (methacrylate), tetrahydrofurfuryl acrylate (methacrylate), 2-chloroethyl acrylate (methacrylate) and dimethylaminoethyl acrylate (methacrylate); epoxy acrylates (methacrylates), such as 2,2-bis(4-acryloxy-diethoxyphenyl)propane diacrylate (dimethacrylate), bisoxypolyethylene-type bisphenol-A-diacrylate (dimethacrylate), bisoxypropylene-type bisphenol-A-acrylate (methacrylate) and bisoxy-2-hydroxyethyl-type bisphenol-A-diacrylate (dimethacrylate); polyester-type diacrylates (dimethacrylates) such as adipic acid-1,6-hexanediol-diacrylate (dimethacrylate); and urethane acrylates (methacrylates).

These acrylates or methacrylates may be used alone or in combination of the two or more kinds thereof. Moreover, if required, a small amount of monomers other than these acrylates or methacrylates may be used together with them. Incidentally, when it is necessary to use a solid monomer, it is preferred that the monomer is used together with a liquid monomer such as 2-hydroxyethyl methacrylate.

As the organic polymer having one or more reactive silicon groups in the molecule, there can be mentioned the compounds as proposed in Japanese Patent Laid-Open Publication Nos. 50-156599 (U.S. Pat. No. 3,971,751), 52-73998, 58-10418 and 62-230822: organic silicone-type compounds having two or more silicon atoms in the molecule, each silicon atom being coupled with hydrolyzable groups, as disclosed in Japanese Patent Laid-Open Publication No. 63-12677; and compositions comprising an oxyalkylene polymer having silicon groups and an acrylate (methacrylate) polymer or copolymer having silicon groups as proposed in Japanese Patent Laid-Open Publication Nos. 60-228516 (U.S. Pat. No. 4,618,656), 63-112642 (EP 0265929) and 1-131271 (U.S. Pat. No. 4,910,255).

The cited Japanese Publication No.63-112642 (EP 265929) discloses a curing compound, which is composed of (1) a copolymer including a reactive silicon group whose molecular chain substantially consists of (i) alkylacrylate and/or alkylmethacrylate monomeric unit having an alkyl group with 1 to 8 carbons, and (ii) alkylacrylate and/or alkylmethacrylate monomeric unit having an alkyl group with 10 or more carbons, and (2) a polymer substantially consisting of oxyalkylene including a reactive silicon group. Here the reactive silicon group represents a functional group including silicon which can form cross linking through siloxane linkage. A typical example of the reactive silicon group is expressed by the general formula (I):

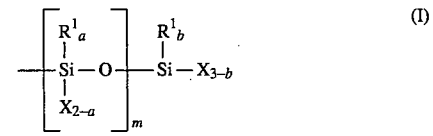

where $R^1$ represents a substituted or unsubstituted monovalent organic group having 1 to 20 carbons, or a triorganosiloxy group; X is a hydroxyl group, or a heterogeneous or homogeneous hydrolyzable group; a is an integer which is 0, 1, or 2; b is an integer which is 0, 1, 2, or 3 (a and b cannot have simulataneously the values a=2 and b=3) and m is an integer from 0 to 18. A preferable reactive and functional silocon group is expressed by;

where is the same as in formula (I), and n is intger of 0,1 or 2.

In addition, it is also possible to use polyester-polyol-type urethane prepolymers or polyether-polyol-type urethane prepolymers, the terminal isocyanate group of which is blocked by an active-hydroxyl-group-containing silane coupling agent such as mercaptosilanes, aminosilanes and hydroxysilanes, and the hydroxy groups included in the polyester-polyol or polyether-polyol site of which are reacted directly with isocyanate silane.

Incidentally, these organic polymers having reactive silicon groups may be used alone or in combination of the two or more kinds thereof. Moreover, if required, it is possible to use them together with a polymerizable monomer such as acrylate or methacrylate.

As the method of curing or setting the acrylate (methacrylate) component according to the present invention, it is possible to adopt methods having been already employed for curing two-part-type radically-polymerizable compositions.

In more detail, as the initiator for the radical polymerization, there can be mentioned diacyl peroxides, such as benzoyl peroxide and acetyl peroxide; hydroperoxides, such as cumene hydroperoxide and t-butyl hydroperoxide; ketone peroxides, such as methyl ethyl ketone peroxide and cyclohexanone peroxide; dialkyl peroxides, such as dicumyl peroxide and di-t-butyl peroxide; peroxy esters such as t-butyl peroxy acetate; combinations of thioglycerol and pyrazoles and/or pyrazolones; and other various known initiators used for radical polymerization.

Incidentally, these radical polymerization initiators may be used in combination of the two or more kinds thereof.

As the polymerization accelerator to be used together with the radical polymerization initiator for curing the acrylate (methacrylate) component of the composition according to the present invention, for example, there can be mentioned tertiary amines, such as N,N-dimethylaniline, N,N-dimethyl-p-toluidine, diisopropanol-p-toluidine and triethylamine; polyamines, such as diethylenetriamine, triethylenetetramine, pentaethylenehexamine; thioureas, such as thiourea, ethylene thiourea, benzoyl thiourea, acetyl thiourea and tetramethyl thiourea; organic or inorganic acid salts of metal such as copper, cobalt, manganese and vanadium, and organic chelate compounds of the same metals with acetylacetone or the like; reducing organic compounds such as ascorbic acid and gallic acid; mercaptans; and other known accelerators such as saccharin and salts thereof.

Also, these polymerization accelerators may be used combination of the two or more kinds thereof.

The total amount of the radical polymerization initiator and polymerization accelerator in the two-part room temperature curable composition of the present invention is substantially the same as used in the conventional manner. For example, the total content of these polymerization agents to the composition is ordinarily 0.05 to 20 wt %, and preferably about 0.1 to 10 wt %. If the content is too low, the polymerization curing rate also becomes low and the curing reaction takes so much time. On the contrary, if too high, excessive heat generation occurs so that a lot of air bubbles are formed in the set layer and the physical properties are drastically degraded, respectively.

If required, in the part mainly containing the radically-polymerizable monomer of the two-part room temperature curable composition according to the present invention, wax such as paraffin wax and rice wax, quinone-type stabilizers such as p-benzoquinone and hydroquinone, hindered-phenol-type antioxidants such as butyl hydroxytoluene, organic or inorganic fillers, dyes, pigments, thixotropic agents, and adhesion-aid agents such as aminosilanes, epoxysilanes and Phosphoric-acid-group-containing acrylate (methacrylate) monomers may be contained as surface-drying-aid agent.

As the means for curing the organic polymer having reactive silicon groups as the other main component of the present invention, known curing accelerators having been already used in the art can be used. As the curing accelerator, there can be mentioned organotin compounds, such as dibutyltin dilaurate, dioctyltin dimalate, dibutyltin phthalate, tin (II) octylate, dibutyltin methoxide, dibutyltin diacetylacetate and dibutyltin diversatate; organic titanate compounds, such as tetrabutyl titanate, tetraisopropyl titanate and triethanolamine titanate; metal carboxylates, such as lead caprylate and cobalt naphthenate; aminosilanes such as γ-aminopropyltriethoxysilane and γ-aminopropyltrimethoxysilane; quarternary ammonium salts, such as tetramethyl ammonium chloride and benzalkonium chloride; organic phosphate compounds, such as monomethyl phosphate, di-n-butyl phosphate and triphenyl phosphate.

These curing accelerators may be used alone or in combination of the two or more kinds thereof. Incidentally, it is also possible to blend these compounds in the component having reactive silicon groups. However, it is preferable to add them to the part comprising only the radically-polymerizable monomer because easy handling can be achieved in view of preservation stability or the like properties.

The amount of the curing accelerator will be enough if it is used in the conventional manner.

If required, in the part mainly containing reactive silicon groups of the two-part room temperature curable composition according to the present invention, there can be further blended wax such as paraffin wax and rice wax, various acrylate (methacrylate) monomers; quinone-type stabilizers such as p-benzoquinone and hydro-quinone, hindered-phenol-type antioxidants such as butyl hydroxytoluene, organic or inorganic fillers, dyes, pigments, thixotropic agents, defoaming agents, leveling agents, viscosity increasers, viscosity reducing agents such as high-boiling-point solvents, and other various additives.

Moreover, when phosphate compounds such as di-n-butyl phosphate and 2-acryl(methacryl)oxyethyl phosphate are used as the curing accelerator for giving extremely rapid curing ability to the reactive-silicon-group-containing compound and if the acid component due to the phosphate compound still remains after the curing reaction of the reactive-silicon-group-containing compound, the heat-age stability is likely to be degraded markedly because the acidity works as depolymerizing catalyst. Therefore, in order to gradually neutralize the acidity, it is recommendable to add inorganic fillers such as calcium oxide, calcium carbonate and magnesium oxide or epoxy compounds such as bisphenol-A-type epoxy compounds and bisphenol-F-type epoxy compounds to the curing reaction. Furthermore, it is also possible to blend an adhesion-aid agent such as epoxysilanes and aminosilanes in the curing reaction system.

The above and other objects, features and advantages of the present invention will become manifest to those versed in the art on making reference to the following detailed description and accompanying tables concerning preferred embodiments of the present invention.

DETAILED DESCRIPTION OF THE INVENTION

Hereinafter, the present invention will be described detail with reference to several embodiments thereof. Unless otherwise stated, parts and % in the description are based on weight respectively. In addition, the two-part room temperature curable composition related to the present invention is constituted by two kinds of liquid compositions, and these two liquid compositions are called here "part liquid A" and "part liquid B" respectively. In this case, part liquid A contains an organic polymer having reactive silicon groups, while part liquid B contains a radically-polymerizable functional monomer.

INVENTIVE EXAMPLE 1

[Preparation of Part Liquid A]

Part liquid A was prepared by stirring and mixing 100 parts of modified silicone S-303 (trade name of an organic polymer having reactive silicon groups, produced by Kanegafuchi Chemical Industry Co., Ltd.) with 20 parts of dicyclopentenyl methacrylate and 2 parts of cumene hydroperoxide by means of a laboratory stirrer.

[Preparation of Part Liquid B]

Part liquid B was prepared by dissolving and stirring 50 parts of dicyclopentenyl methacrylate, parts of 2-hydroxypropyl methacrylate, 0.05 part of vanadium acetylacetonate, 0.5 part of hydroquinone and 2 parts of 2-methacryloxyethyl phosphate together by means of a laboratory stirrer.

Then a two-part room temperature curable composition was prepared by blending these part liquids A and B at the ratio of 1:1 (weight ratio).

Based on the successive curing or setting test over the obtained two-part room temperature curing composition, 1. curing or setting time, 2. flexibility and 3. curing or setting state of the composition were evaluated respectively. From the results shown in Table 1, it can be seen that the composition has good curing time (6 minutes) and flexibility as well as presents a uniform curing state over its entire body.

1. Setting Time

Two sheets of soft steel plates having a length of 100 mm, width of 25 mm and thickness of 1.5 mm were laminated together by the composition of Inventive Example 1 with a half-inch lap. Then the time requied for the laminated body to overcome a load of 3 kg given along the body was measured as the curing time.

2. Flexibility a test piece was made by coating the composition of Inventive Example 1 prepared by the blending at the above-mentioned ratio at a thickness of 1.0 mm over a soft steel plate having a length of 100 mm, width of 25 mm and thickness of 0.5 mm, and then curing the composition at room temperature for 24 hours. Thereafter, the test piece was wound around a 1-inch mandrel at room temperature to observe the change of its surface.

3. Setting State

The curing or setting state of the composition of Inventive Example 1 was observed during preparation of 50 g of the curable composition by the blending at the above-mentioned ratio.

INVENTIVE EXAMPLES 2 to 5

[Preparation of Part Liquid A]

Part liquid A for each Example was prepared in the same manner as in Inventive Example 1 except by using, in place of the modified silicone S-303, modified silicone SAT-010 (trade name of an organic polymer having reactive silicon groups for Inventive Example 2, produced by Kanegafuchi Chemical Industry Co., Ltd.), modified silicone M-217 (trade name of an organic polymer having reactive silicon groups for Inventive Example 3, produced by Kanegafuchi Chemical Industry Co., Ltd.) and synthetic compounds 1 and 2 (for Inventive Examples 4 and 5 respectively) which will be mentioned below.

The curing or setting test over the combination of each part liquid A and part liquid B of Inventive Example 1 was carried out in the same manner as conducted in Inventive Example 1. As seen from the test results also shown in Table 1, all the above-stated curing or setting properties of any combination are good for practical use.

[Preparation of Synthetic Compound 1]

In a four-necked flask equipped With a stirrer, thermometer, nitrogen-gas introducing tube and reflux condenser at its each neck,300 parts of polytetramethylene ether glycol having a molecular weight of 3000 was supplied. Then the ether glycol was heated at 120° C. with stirring, and dry nitrogen gas was fed in the glycol to dry it until the moisture contained therein became less than 0.003% as measured by the Karl-Fischer's moisture meter. Subsequently, the content of the flask was cooled down to 30° C., and 44 parts of Y-9030 (trade name of isocyanatesilane produced by NIPPON YUNIKA Co., Ltd.) and 0.1 part of di-n-butyltin dilaurate were added in the flask. Thereafter, the reaction was continued with stirring at 30° to 50° C. until disappearance of the NCO group was confirmed by the IR measurement, threreby to obtain an isocyanatesilane addition compound having polyol structure.

[Preparation of Synthetic Compound 2]

In a four-necked flask similar to that of Inventive Example 4, 2000 parts of polypropylene glycol having a molecular weight of 2000 was supplied, and then the moisture was removed in the same manner as in the case of Inventive Example 4. Subsequently, 68 parts of MDI was added to the content of flask with keeping its temperature at 80° to 90° C. Then the reaction was continued at the same temperature until the NCO content reached 1.45%. Thereafter, 230 parts of γ-aminopropyltrimethoxysilane and 0.1 part of di-n-butyltin dilaurate were fed to the flask, and the reaction was finished at disappearance of the NCO group by the IR measurement as in Inventive Example 4. As the result, a compound in which aminosilane is added to the NCO group in an urethane prepolymer having polyol structure was obtained.

TABLE 1

| Number of Inventive Example | Setting Time (minutes) | Properties Flexibility | Setting State |
| --- | --- | --- | --- |
| 1 | 6 | good | good* |
| 2 | 5 | " | " |
| 3 | 7 | " | " |
| 4 | 6 | " | " |
| 5 | 6 | " | " |

(Note)
*: uniformly cured or set over the entire body at the same time

COMPARATIVE EXAMPLE 1

60 parts of methyl methacrylate, 40 parts of 2-hydroxyethyl methacrylate, 10 parts of HYCAR 1072 (trade name of NBR rubber produced by JAPAN SYNTHETIC RUBBER Co., Ltd.), 0.5 part of paraffin wax and 0.1 part of hydroquinone were stirred with a laboratory stirrer to obtain a uniform liquid. Then, 4 parts of cumene hydroperoxide was added to a half of the admixture to obtain a uniform liquid (part liquid A). Moreover, 2 parts of ethylene thiourea and 1 part of 2-methacryloxyethyl phosphate were added to the other half of the admixture to obtain another uniform liquid (part liquid B). Thereafter, these part liquids a and B were blended at the ratio of 1:1 to obtain a conventionally-known acrylate (methacrylate) type composition (two-part room temperature curable composition).

So-obtained part liquids a and B were then blended in the same manner as in Inventive Example 1, and the setting test as in Inventive Example 1 was also conducted to examine the setting properties. As the result, the setting time was good (8 minutes), but the flexibility was inferior to that of Inventive Examples because crack, peeling and foaming were seen. Moreover, the curing state was not uniform because the reaction heat caused foaming.

COMPARATIVE EXAMPLE 2

Part liquid a was prepared by adding 5 parts of tris (dimethylamino)phenol to 100 parts of SAIRYL 5B-30 (produced by Kaneigafuchi Chemical Industry Co., Ltd.), while part liquid B was obtained by adding 3 parts of dibutyltin dilaurate to 100 parts of EPIKOTE #828 (produced by Shell Chemical Co., Ltd.) as an epoxy compound. Incidentally, the blending ratio between these liquids a and B was 2:1 as the weight ratio. In this manner, a two-part room temperature curable composition was obtained.

The curing or setting test was conducted by blending part liquids A and B at the weight ratio of 2:1 to evaluate the above-stated properties. The curing time was so long as to be 65 minutes. The flexibility was good, but the curing state was not uniform, and a thin coat layer was formed over the surface after the lapse of about 60 minutes.

INVENTIVE EXAMPLES 6 to 12

In the following examples, the reaction component (c) is a polymerization initiator of the radically-polymerizable monomer, (b) is a polymerization accelerator of the radically-polymerizable monomer and (c) is a curing accelerator of the organic polymer having reactive silicon groups.
[Preparation of Part Liquid A]

Part liquid A of each example was prepared by admixing 100 parts of modified silicone S-303 (trade name of an organic polymer having reactive silicon groups, produced by Kanegafuchi Chemical Industry Co., Ltd.) and 20 parts of dicyclopentenyl methacrylate, together with, (c) 4 parts of cumene hydroperoxide (Inventive Example 6), (b) 2 parts of ethylene thiourea (Inventive Example 7), (c) 4 parts of cumene hydroperoxide and (b) 2 parts of 3,5-dimethylpyrazole and 0.5 part of 1-phenyl-3-methyl-5-pyrazolone (Inventive Example 8), (c) 4 parts of methyl ethyl ketone peroxide (Inventive Example 9), (c) 1 part of benzoyl peroxide (Inventive Example 10), 2 parts of 3,5-dimethylpyrazole and 0.5 part of thioglycerol (Inventive Example 11), or (c) 2 parts of cumene hydroperoxide and (b) 1 part of saccharin (Inventive Example 12).
[Preparation of Part Liquid B]

Part liquid B of each example was prepared by admixing 50 parts of dicyclopentenyl methacrylate, 50 parts of 2-hydroxypropyl methacrylate, together with, 2 parts of ethylene thiourea and 1 part of (e) di-n-butyl phosphate (Inventive Example 6), (c) 4 parts of cumene hydroperoxide and (e) 1 part of di-n-butyl phosphate (Inventive Example 7), (b) 0.1 part of copper 2-ethyl-hexanoate and 1 part of (e) PHOSMER M (trade name of acid phosphoxy ethylmethacrylate produced by YUSHI SEIHIN Co., Ltd.) (Inventive Example 8), (b) 0.1 part of cobalt naphthenate and (e) 0.5 part of di-n-butyltin dilaurate (Inventive Example 9), (b) 1 part of N,N-dimethyl-p-toluidine and (e) 0.5 part of dibutyltin diacetylacetate (Inventive Example 10), 0.1 part of vanadium acetyl-acetonate and 1 part of (e) PHOSMER M (trade name of acid phosphoxy ethylmethacrylate produced by YUSHI SEIHIN Co., Ltd.) (Inventive Example 11), or (b) 0.1 part of N,N-dimethyl-p-toluidine, 0.01 part of copper 2-ethylhexanoate and 1 part of tri-n-butylamine and (e) 0.5 part of dibutyltin diacetylacetate and 1 part of γ-aminopropyltriethoxysilane (Inventive Example 12).

The properties of each obtained two-part room temperature curable composition were evaluated in the same manner as in the case of Inventive Example 1. as is seen from the results of evaluation shown in Table 2, all the properties of every example were good for practical use.

Namely, from the results of Inventive Examples 6 to 12, we found that the two-part room temperature curable composition according to the present invention presents good curing properties in case of using various polymerization initiators and polymerization accelerators of the radically-polymerizable monomer.

Moreover, we also recognized that it is possible to use various compounds as the curing accelerator for the organic polymer having reactive silicon groups.

In addition, as is seen from the results of Inventive Examples 6 and 7, it is also possible to exchange the polymerization initiator and/or polymerization accelerator of the radically-polymerizable monomer in one example for the other initiator and/or accelerator in the other example between the part liquids A and B of them.

TABLE 2

| Number of Inventive Example | Setting Time (minutes) | Properties Flexibility | Setting State |
| --- | --- | --- | --- |
| 6 | 8 | good | good* |
| 7 | 8 | " | " |
| 8 | 6 | " | " |
| 9 | 10 | " | " |
| 10 | 2 | " | " |
| 11 | 3 | " | " |
| 12 | 5 | " | " |

(Note)
*: uniformly cured or set over the entire body at the same time

INVENTIVE EXAMPLES 13 to 21

In the following inventive examples, (a) designates a radically-polymerizable monomer and (f) is a stabilizer.
[Preparation of Part Liquid A]

Part liquid A of each example was prepared by dissolving and stirring with a laboratory stirrer 100 parts of modified silicone SAT-010 (trade name of an organic polymer having reactive silicon groups, produced by Kanegafuchi Chemical Industry Co., Ltd.), together with, (a) 20 parts of methyl methacrylate, (c) 1 part of cumene hydroperoxide, (b) 2 parts of dimethylpyrazole and 0.5 part of thioglycerol (Inventive Example 13), no (a) and the same (c) and (b) as those in Inventive Example 13 (Inventive Example 14), (a) 20 parts of isobornyl acrylate and the same (c) and (b) as those in Inventive Example 13 (Inventive Example 15), (a) 20 parts of dicyclopentenyl acrylate and the same (c) and (b) as those in Inventive Example 13 (Inventive Example 16), (a) 10 parts of diallyl phthalate monomer and the same (c) and (b) as those in Inventive Example 13 (Inventive Example 17), no (a) and the same (c) and (b) as those in Inventive Example 13 (Inventive Example 18), (a) 20 parts of NK ESTER BE400 (trade name of 2,2'-bis(4-methacryloxydiethoxyphenyl)propane produced by SHIN NAKUMAURA CHEMICAL INDUSTRY CO., LTD.) and the same (c) and (b) as those in inventive Example 13 (Inventive Example 19), (a) 10 parts of styrene monomer and the same (c) and (b) as those in Inventive Example 13 (Inventive Example 20), or (a) 20 parts of dicyclopentenyl methacrylate, (c) 4 parts of cumene hydroperoxide and the same (b) as those in Inventive Example 13 (Inventive Example 21).
[Preparation of Part Liquid B]

Part liquid B of each example was prepared by dissolving and stirring with a laboratory stirrer (a) 40 parts of methyl methacrylate and 60 parts of 2-hydroxyethyl methacrylate (b) and/or (e) 3 parts of ACCELERATOR VN$_2$ (trade name of acidic phosphoric acid solution of vanadium produced by NIPPON KAYAKU CO., LTD.) and (f) 0.5 part of butylhydroxytoluene (Inventive Example 13), (a) 60 parts of 2-hydroxypropyl methacrylate and 40 parts of LIGHT ESTER 3002M (trade name of epoxy dimethacrylate produced by KYOEISHA YUSHI CHEMICAL CO., LTD.) and the same (b), (e) and (f) as those in Inventive Example 13

(Inventive Example 14), 60 parts of isobornyl acrylate and 40 parts of ART RESIN UN-6060PTM (trade name of urethane dimethacrylate produced by NEGAMI INDUSTRY CO., LTD.) and the same (b), (d) and (f) as those in Inventive Example 13 (Inventive Example 15), 50 parts of dicyclopentenyl acrylate and 50 parts of 2-hydroxypropyl acrylate and the same (b), (e) and (f) as those in Inventive Example 13 (Inventive Example 16), (a) 10 parts of diallyl phthalate monomer and 90 parts of 2-hydroxypropyl methacrylate and the same (b), (e) and (f) as those in Inventive Example 13 (Inventive Example 17), (a) 10 parts of trimethylolpropane trimethacrylate and 90 parts of dicyclopentenyl methacrylate and the same (b), (e) and (f) as those in Inventive Example 13 (Inventive Example 18), (a) 20 parts of NK ESTER BE400 (trade name of 2,2'-bis(4-methacryloxydiethoxyphenyl)propane produced by SHIN NAKAMURA CHEMICAL INDUSTRY CO., LTD.) and the same (b), (e) and (f) as those in Inventive Example 13 (Inventive Example 19), (a) 40 parts of styrene monomer and 60 parts of NEW TRACK 420S (bisphenol-A type unsaturated polyester resin produced by KAO CORP.) and the same (b), (e) and (f) as those in Inventive Example 13 (Inventive Example 20), or (a) 60 parts of ART RESIN UNA-6 ((trade name of urethane dimethacrylate produced by NEGAMI INDUSTRY CO., LTD.) and 40 parts of dicyclopentenyl methacrylate, (b) 2 parts of ethylene thiourea and 0.02 part of copper naphthenate, (e) 2 parts of dibutyltin diacetylacetate and 1 part of dibutyltin sulfide and the same (f) as in Inventive Example 13 (Inventive Example 21).

The properties of each obtained two-part room temperature curing composition were evaluated in the same manner as in the case of Inventive Example 1. As is seen from the results of evaluation shown in Table 3, all the properties of every example were good for practical use.

Namely, from the results of Inventive Examples 13 to 21, we found that various polymerizable monomers can be used for the two-part room temperature curable composition according to the present invention.

TABLE 3

| Number of Inventive Example | Setting Time (minutes) | Properties Flexibility | Setting State |
| --- | --- | --- | --- |
| 13 | 5 | good | good* |
| 14 | 5 | " | " |
| 15 | 6 | " | " |
| 16 | 6 | " | " |
| 17 | 8 | " | " |
| 18 | 4 | " | " |
| 19 | 7 | " | " |
| 20 | 10 | " | " |
| 21 | 2 | " | " |

(Note)
*: uniformly cured or set over the entire body at the same time

INVENTIVE EXAMPLES 22 to 26

[Preparation of Part Liquid A]
Part liquid A of each example was prepared by dissolving and stirring with a laboratory stirrer 80 parts of modified silicone S-303 (trade name of an organic polymer having reactive silicon groups, produced by Kanegafuchi Chemical Industry Co., Ltd.) and 20 parts of modified silicone SAT-010 (trade name of an organic polymer having reactive silicon groups, produced by Kanegafuchi Chemical Industry Go., Ltd.), together with 1 part of cumene hydroperoxide and 0.5 part of thioglycerol.

[Preparation of Part Liquid B]
Part liquid B of each example was prepared by dissolving and stirring with a laboratory stirrer 40 parts of dicyclopentenyl methacrylate, 40 parts of 2-hydroxypropyl methacrylate and 20 parts of NK ESTER BE-400, together with 3 parts of 3,5-dimethylpyrazole, 4 parts of ACCELAERATOR $VN_2$, 2 parts of $\gamma$-methacryloxytrimethoxysilane and 0.3 part of butylhydroxytoluene.

So-obtained part liquids A and B were then mixed at the ratios of 10:90 (Inventive Example 22), 25:75 (Inventive Example 23), 50:50 (Inventive Example 24), 75:25 (Inventive Example 25) and 90:10 (Inventive Example 26), respectively. Moreover, the curing properties of the respective examples were evaluated in the same manner as in Inventive Example 1. Is shown in Table 4, good results were obtained over all of these inventive examples.

From the results of Inventive Examples 22 to 26 the two-part room temperature curable composition of the present invention can present good curing properties over a wide mixing range of part liquids A and B.

TABLE 4

| Number of Inventive Example | Setting Time (minutes) | Properties Flexibility | Setting State |
| --- | --- | --- | --- |
| 22 | 5 | good | good* |
| 23 | 7 | " | " |
| 24 | 8 | " | " |
| 25 | 10 | " | " |
| 26 | 12 | " | " |

(Note)
*: uniformly cured or set over the entire body at the same time

INVENTIVE EXAMPLE 27

Part liquid A was prepared by dissolving and stirring with a laboratory stirrer 100 parts of modified silicone S-303 (trade name of an organic polymer having reactive silicon groups, produced by Kanegafuchi Chemical Industry Co., Ltd.) and 100 parts of dicyclopentenyl methacrylate together with 4 parts of cumene hydroperoxide as a polymerization initiator of the radically-polymerizable monomer.

[Preparation of Part Liquid B]
Part liquid B was prepared by dissolving and stirring with a laboratory stirrer 0.2 part of vanadium acetylacetonate as a polymerization accelerator of the radically-polymerizable monomer and 1 part of di-n-butyl phosphate as a curing accelerator of the organic polymer having reactive silicon groups.

The properties of the obtained two-part room temperature curable composition were evaluated in the same manner as in Inventive Example 1. As the result, the curing time was 8 minutes, and the flexibility was allowable. In addition, the curing state was so good that the entire body was cured uniformly at the same time.

From the results of Inventive Example 27, we found that the two-part room temperature curable composition of the present invention can present good curing properties even in the case in which the part liquid A contains an organic polymer having reactive silicon groups, a radically-polymerizable monomer and a polymerization initiator of the radically-polymerizable monomer while the part liquid B containing only a curing accelerator of the organic polymer having reactive silicon groups and a polymerization accelerator of the radically-polymerizable monomer.

Of course, it is possible to exchange the polymerization initiator and polymerization accelerator each for the other if

13 undesirable reaction does not occur to the curing accelerator of the organic polymer having reactive silicon groups.

INVENTIVE EXAMPLES 28 to 33

[Preparation of Part Liquid A]

Part liquid A of each inventive example was prepared by dissolving and stirring with a laboratory stirrer 100 parts of modified silicone S-302 (trade name of an organic polymer having reactive silicon groups, produced by Kanegafuchi Chemical Industry Co., Ltd.) and 100 parts of dicyclopentenyl methacrylate together with 4 parts of cumene hydroperoxide as a polymerization initiator of the radically-polymerizable monomer and 2 parts of dibutyltin diacetylacetate as a curing accelerator of the organic polymer having reactive silicon groups. Moreover, the system of part liquid a for Inventive Examples 31 to 33 further contains 1 part of saccharin as a curing accelerator of the radically-polymerizable monomer.

[Preparation of Part Liquid B]

Part liquid B of each example was prepared by using, as a polymerization accelerator of the radically-polymerizable monomer, 100 parts of ACCELERATOR VN₂ (trade name of acidic phosphoric acid solution of vanadium produced by NIPPON KAYAKU CO., LTD.) (Inventive Example 28), 100 parts of 8% copper naphthenate solution (Inventive Example 29), 100 parts of 6% cobalt naphthenate solution (Inventive Example 30), 100 parts of VANACS #808 (trade name of a reagent produced by reaction of amine and aldehyde by DUPONT CO., LTD.) (Inventive Example 31), 100 parts of 8% copper naphthenate solution (Inventive Example 32), or 100 parts of 6% cobalt naphthenate solution (Inventive Example 33).

The properties of each obtained two-part room temperature curable composition were evaluated in the same manner as in Inventive Example 1. The results are shown in Table 5. As is seen from Table 5, all the properties of every example were allowably good.

Namely, from the results of Inventive Examples 28 to 33, we found that the two-part room temperature curable composition of the present invention can present good properties even in the case where the polymerization accelerator of radically-polymerizable monomer is blended in the part liquid B.

TABLE 5

| Number of Inventive Example | Setting Time (minutes) | Properties Flexibility | Setting State |
| --- | --- | --- | --- |
| 28 | 3 | good | good* |
| 29 | 2 | " | " |
| 30 | 3 | " | " |
| 31 | 2 | " | " |
| 32 | 2 | " | " |
| 33 | 3 | " | " |

(Note)
*: uniformly cured or set over the entire body at the same time

INVENTIVE EXAMPLES 34 to 39

The same part liquids A and B as those in Inventive Examples 28 to 33 were used, and tests on curing time and flexibility were carried out, including a method in which part liquid B was coated thinly on one side of a substrate with a waste piece and part liquid A was coated on liquid B without blending therewith. The results are shown in Table 6. As seen from Table 6, all the properties of every example were good for practical use.

Namely, from the results of Inventive Examples 34 to 39, we found that the two-part room temperature curable composition of the present invention can present good properties even in the case where the part liquid B is used as curing accelerator primer.

Moreover, we also recognized that the two-part room temperature curable composition can be used in the so-called honeymoon adhesion in which part liquid A coated on one side of one substrate is covered on part liquid B coated on one side of the other substrate.

TABLE 6

| Number of Inventive Example | Setting Time (minutes) | Properties Flexibility |
| --- | --- | --- |
| 34 | 3 | good |
| 35 | 2 | " |
| 36 | 3 | " |
| 37 | 2 | " |
| 38 | 2 | " |
| 39 | 3 | " |

As stated above, since the two-part room temperature curable composition of the present invention has rapid curing ability and flexibility equivalent to that of rubber materials, when used as flexible protective coating, potting material, sealing material or adhesive, the workability and reliability can be enhanced sharply as compared with the above prior art.

Even if a radically-polymerizable monomer having weak odor or low volatility other than the methyl methacrylate monomer is used in this case, since the curing or setting system of the organic polymer having reactive silicon groups is used together with the monomer, the surface curing or setting can be rapidly completed. Therefore, it becomes possible to prevent pollution of the working environment to be caused in general by such a volatile polymerizable monomer.

Moreover, without materials such as NBR rubber or the like which takes much time to be dissolved, the composition of this invention can be prepared only by nixing liquid parts. Thus, the production cost can be reduced greatly.

Furthermore, the two-part room temperature curable composition of the present invention can be used for filling in a great amount or adhesion over a wide area, such as panels, to which the conventional acryl or methacryl type curable composition can not be applied because of its large curing shrinkage, or for adhesion to ferrite magnet to which the conventional one can not be utilized because of its undesirably high hardness at low temperature.

In addition, the two-part room temperature curable composition of the present invention can be applied to a low-temperature working environment in which the conventional modified silicone-epoxy type curable composition can not be used because of its low curing or setting rate at low temperature. Further, the composition according to this invention can be also used effectively for gap filling to which the conventional silicone-epoxy composition can not be applied because it can not be set uniformly over the entire body, or for assembly working in production lines in which the conventional one can not be used because of its low curing rate.

Obviously, various modifications and variations of the present invention are possible in the light of the above teaching. It is therefore to be understood that within the scope of the appended claims the invention may be practiced otherwise than as specifically described.

What is claimed is:

1. A two-part room temperature curable composition comprising:
   A. A first liquid comprising, as essential components:
      d. an organic polymer containing reactive silicon groups, and
      b. an accelerator for the polymerization of a radically-polymerizable monomer; and
   B. a second liquid comprising, as essential components:
      a. a radically-polymerizable monomer,
      c. an initiator for the polymerization of said radically-polymerizable monomer, and
      e. an accelerator for curing said organic polymer containing reactive silicon groups
   wherein said first liquid A and said second liquid B are maintained at temperatures prior to admixture with each other such that said component d does not react to any substantial extent prior to their admixture, and
   wherein said first liquid A and said second liquid B react together at room temperature to directly form a cured product with up to about 10 minutes.

2. A two-part room temperature curable composition comprising:
   A. a first liquid comprising, as essential components:
      d. an organic polymer containing reactive silicon groups and
      c. an initiator for the polymerization of a radically-polymerizable monomer; and
   B. a second liquid comprising, as essential components:
      a. a radically-polymerizable monomer,
      b. an accelerator for the polymerization of said radically-polymerizable monomer, and
      e. an accelerator for curing said organic polymer containing reactive silicon groups
   wherein said first liquid A and said second liquid B are maintained at temperatures prior to admixture with each other such that said component a does not polymerize, and the reactive silicon groups in said component d do not react to any substantial extent prior to their admixture, and
   wherein said first liquid A and said second liquid B react together at room temperature to directly form a cured product within up to about 10 minutes.

3. A two-part room temperature curable composition comprising:
   A. a first liquid comprising, as essential components:
      d. an organic polymer containing reactive silicon groups,
      a. radically-polymerizable monomer, and
      b. an accelerator for the polymerization of said radically-polymerizable monomer; and
   B. a second liquid comprising, as essential components:
      a. a radically-polymerizable monomer,
      c. an initiator for the polymerization of said radically-polymerizable monomer, and
      e. an accelerator for curing said organic polymer containing reactive silicon groups
   wherein said first liquid A and said second liquid B are maintained at temperatures prior to admixture with each other such that said component a does not polymerize, and the reactive silicon groups in said component d do not react to any substantial extent prior to their admixture, and
   wherein said first liquid A and said second liquid B react together at room temperature to directly form a cured product within up to about 10 minutes.

4. A two-part room temperature curable composition comprising:
   A. a first liquid comprising, as essential components:
      d. an organic polymer containing reactive silicon groups,
      a. a radically-polymerizable monomer, and
      c. an initiator for the polymerization of said radically-polymerizable monomer; and
   B. a second liquid comprising, as essential components:
      a. a radically-polymerizable monomer,
      b. an accelerator for the polymerization of said radically-polymerizable monomer, and
      e. an accelerator for curing said organic polymer containing reactive silicon groups
   wherein said first liquid A and said second liquid B are maintained at temperatures prior to their admixture together such that said component a does not polymerize, and the reactive silicon groups in said component d do not react to any substantial extent prior to their admixture together, and
   wherein said first liquid A and said second liquid B react together at room temperature to directly form a cured product within up to about 10 minutes.

5. A two-part room temperature curable composition comprising:
   A. a first liquid comprising:
      d. an organic polymer containing reactive silicon groups,
      a. a radically-polymerizable monomer, and
      c. an initiator for the polymerization of said radically-polymerizable monomer; and
   B. a second liquid comprising, as essential components:
      e. an accelerator for curing said organic polymer containing reactive silicon groups, and
      b. an accelerator for the polymerization of said radically-polymerizable monomer;
   wherein said first liquid A and said second liquid B are maintained at temperatures prior to their admixture together such that said component a does not polymerize, and the reactive silicon groups in said component d do not react to any substantial extent prior to said admixture together, and
   wherein said first liquid A and said second liquid B react together at room temperature to directly form a cured product within up to about 10 minutes.

6. A two-part room temperature curable composition comprising:
   A. a first liquid comprising, as essential components:
      d. an organic polymer containing reactive silicon groups,
      a. a radically-polymerizable monomer, and
      b. an accelerator for the polymerization of said radically-polymerizable monomer; and
   B. a second liquid comprising, as essential components:
      e. an accelerator for curing said organic polymer containing reactive silicon groups, and
      c. an initiator for the polymerization of said radically-polymerizable monomer
   wherein said first liquid A and said second liquid B are maintained at temperatures prior to their admixture together such that said component a does not polymerize, and the reactive silicon groups in said component d do not react to any substantial extent prior to their admixture, and wherein said first liquid A and said second liquid B react together at room temperature to directly form a cured product within up to about 10 minutes.

7. A two-part room temperature curable composition comprising:
   A. a first liquid comprising, as essential components:
      d. an organic polymer containing reactive silicon groups,
      a. a radically-polymerizable monomer,
      b. an accelerator for the polymerization of said radically-polymerizable monomer, and
      e. an accelerator for curing said organic polymer containing reactive silicon group; and
   B. a second liquid comprising, as essential components:
      c. an initiator for the polymerization of said radically-polymerizable monomer wherein said first liquid A and said second liquid B are maintained at temperatures prior to their admixture together such that said component a does not polymerize, and the reactive silicon groups in said component d do not react to any substantial extent prior to their admixture, and wherein said first liquid A and said second liquid B react together at room temperature to directly form a cured product within up to about 10 minutes.

8. A composition as claimed in claim 1 wherein said reactive silicon groups are represented by the following formulae (I) and/or (II):

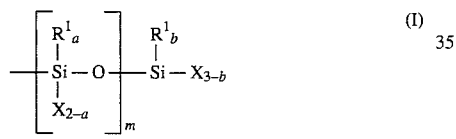

wherein R represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

wherein R is as defined in formula (I) and n is an integer of 0, 1 or 2.

9. A composition as claimed in claim 2 wherein said reactive silicon groups are represented by the following general formulae (I) and/or (II).

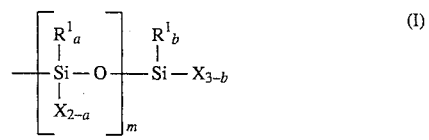

wherein R⁻ represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

wherein $R^1$ is as defined in formula (i) and n is an integer of 0, 1 or 2.

10. A composition as claimed in claim 3 wherein said reactive silicon groups are represented by the following general formulae (I) and/or (II):

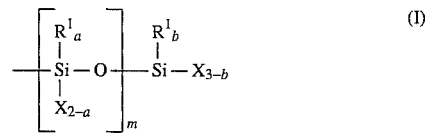

wherein $R^1$ represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

wherein $R^1$ is as defined in formula (I) and n is an integer of 0, 1 or 2.

11. A composition as claimed in claim 4 wherein said reactive silicon groups are represented by the following general formulae (I) and/or (II):

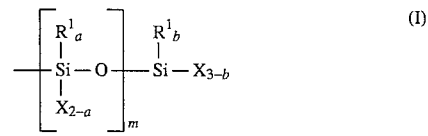

wherein $R^1$ represents a monovalent organic group having 1 to 20 carbon atoms, or a triorganosiloxy group x represents a hydroxyl group of a heterogeneous or homogeneous hydrolyzable group; a is an integer of 0, 1 or 2; b is an integer of 0, 1, 2 or 3, provided that a is not 2 when b is 3; and m is an integer of 0 to 18;

wherein $R^1$ is as defined in formula (I) and n is an integer of 0, 1 or 2.

12. A composition as claimed in claim 5 wherein said reactive silicon groups are represented by the following general formulae (I) and/or (II):

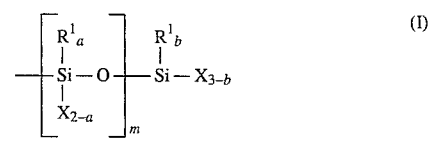

wherein $R^1$ represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

$$\begin{array}{c} R^1{}_n \\ | \\ -Si-X_{3-n} \end{array} \quad (II)$$

wherein $R^1$ is as defined in formula (I) and n is an integer of 0, 1 or 2.

13. A composition as claimed in claim 6 wherein said reactive silicon groups are represented by the following general formulae (I) and/or (II):

$$\left[ \begin{array}{c} R^1{}_a \\ | \\ Si-O \\ | \\ X_{2-a} \end{array} \right]_m \begin{array}{c} R^1{}_b \\ | \\ Si-X_{3-b} \end{array} \quad (I)$$

wherein $R^1$ represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

$$\begin{array}{c} R^1{}_n \\ | \\ -Si-X_{3-n} \end{array} \quad (II)$$

wherein $R^1$ is as defined in formula (I) and n is an integer of 0, 1 or 2.

14. A composition as claimed in claim 7 wherein said reactive silicon groups are represented by the following general formulae (I) and/or (II):

$$\left[ \begin{array}{c} R^1{}_a \\ | \\ Si-O \\ | \\ X_{2-a} \end{array} \right]_m \begin{array}{c} R^1{}_b \\ | \\ Si-X_{3-b} \end{array} \quad (I)$$

wherein $R^1$ represents a monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

$$\begin{array}{c} R^1{}_n \\ | \\ -Si-X_{3-n} \end{array} \quad (II)$$

wherein $R^1$ is as defined in formula (I) and n is an integer of 0, 1 or 2.

15. A process of producing a cured polymeric product comprising:
  forming a first liquid A comprising, as essential components:
    d. a curable organic polymer containing reactive silicon, and
    b. an accelerator for the polymerization of a radically polymerizable monomer;
  forming a second liquid B comprising, as essential components:
    a. a radically polymerizable monomer, the polymerization of which is accelerated by said accelerator "b",
    c. an initiator for the polymerization of said radically polymerizable monomer, and
    e. an accelerator for curing said organic polymer containing reactive silicon groups;
  maintaining said first liquid A and said second liquid B separate and at temperatures, respectively, such that said component "a" does not polymerize and the reactive silicon in said component "d" does not react to any substantial extent;
  mixing said liquids A and B at room temperature to form a mixture;
  holding said mixture for up to about 10 minutes at room temperature sufficient to polymerize said component "a", to cure said polymer, and to react said reactive silicon to an extent sufficient form a cured, solid polymeric product; and
  recovering said cured solid polymeric product.

16. A process of producing a cured polymeric product comprising:
  forming a first liquid A comprising, as essential components:
    d. a curable organic polymer containing reactive silicon groups, and
    c. an initiator for the polymerization of a radically polymerizable monomer;
  forming a second liquid B comprising, as essential components:
    a. a radically-polymerizable monomer, the polymerization of which is initiated by said initiator "c",
    b. an accelerator for the polymerization of said radically-polymerizable monomer, and
    e. an accelerator for curing said organic polymer containing reactive silicon groups;
  maintaining said first liquid A and said second liquid B separate and at temperatures, respectively, such that said component "a" does not polymerize and the reactive silicon in said component "d" does not react to any substantial extent;
  mixing said liquids A and B at room temperature to form a mixture;
  holding said mixture for up to about 10 minutes at room temperature sufficient to polymerize said component "a", to cure said polymer, and to react said reactive silicon to an extent sufficient form a cured, solid polymeric product; and
  recovering said cured solid polymeric product.

17. A process of producing a cured polymeric product comprising:
  forming a first liquid A comprising, as essential components:
    d. a curable organic polymer containing reactive silicon groups,
    a radically-polymerizable monomer, and
    an initiator for the polymerization of said radically-polymerizable monomer;
  forming a second liquid B comprising, as essential components:
    a. a radically-polymerizable monomer,
    b. an accelerator for the polymerization of said radically-polymerizable monomer, and
    e. an accelerator for curing said organic polymer containing reactive silicon groups;
  maintaining said first liquid A and said second liquid B separate and at temperatures, respectively, such that said component "a" does not polymerize and the reactive silicon in said component "d" does not react to any substantial extent;
  mixing said liquids A and B at room temperature to form a mixture;

holding said mixture for up to about 10 minutes at room temperature sufficient to polymerize said component "a", to cure said polymer, and to react said reactive silicon to an extent sufficient form a cured, solid polymeric product; and recovering said cured solid polymeric product.

18. A process of producing a cured polymeric product comprising:

forming a first liquid A comprising, as essential components:
d. a curable polymer containing reactive silicon,
a radically-polymerizable monomer, and
c. an initiator for the polymerization of said radically-polymerizable monomer;

forming a second liquid B comprising, as essential components
a. a radically-polymerizable monomer,
b. an accelerator for the polymerization of said radically-polymerizable monomer, and
e. an accelerator for curing said organic polymer containing silicon groups;

maintaining said first liquid A and said second liquid B separate and at temperatures, respectively, such that said component "a" does not polymerize and the reactive silicon in said component "d" does not react to any substantial extent;

mixing said liquids A and B at room temperature to form a mixture;

holding said mixture for up to about 10 minutes at room temperature sufficient to polymerize said component "a", to cure said polymer, and to react said reactive silicon to an extent sufficient form a cured, solid polymeric product; and recovering said cured solid polymeric product.

19. A process of producing a cured polymeric product comprising:

forming a first liquid A comprising, as essential components:
d. a curable polymer containing reactive silicon groups,
a. a radically-polymerizable monomer, and
c. an initiator for the polymerization of said radically-polymerizable monomer;

forming a second liquid B comprising, as essential components:
e. an accelerator for curing said organic polymer containing reactive silicon groups, and
b. an accelerator for the polymerization of said radically-polymerizable monomer;

maintaining said first liquid A and said second liquid B separate and at temperatures, respectively, such that said component "a" does not polymerize and the reactive silicon in said component "d" does not react to any substantial extent;

mixing said liquids A and B at room temperature to form a mixture;

holding said mixture for up to about 10 minutes at room temperature sufficient to polymerize said component "a", to cure said polymer, and to react said reactive silicon to an extent sufficient form a cured, solid polymeric product; and recovering said cured solid polymeric product.

20. A process of producing a cured polymeric product comprising:

forming a first liquid A comprising, as essential components:
d. a curable organic polymer containing reactive silicon groups,
a. radically-polymerizable monomer, and
b. an accelerator for the polymerization of said radically-polymerizable monomer;

forming a second liquid B comprising, as essential components:
e. an accelerator for curing said organic polymer containing reactive silicon groups, and
c. an initiator for the polymerization of said radically-polymerizable monomer;

maintaining said first liquid A and said second liquid B separate and at temperatures, respectively, such that said component "a" does not polymerize and the reactive silicon in said component "d" does not react to any substantial extent;

mixing said liquids A and B at room temperature to form a mixture;

holding said mixture for up to about 10 minutes at room temperature sufficient to polymerize said component "a", to cure said polymer, and to react said reactive silicon to an extent sufficient form a cured, solid polymeric produce; and recovering said cured solid polymeric product.

21. A process of producing a cured polymeric product comprising:

forming a first liquid A comprising, as essential components:
d. a curable polymer containing reactive silicon groups,
a. radically-polymerizable monomer,
b. an accelerator for the polymerization of said radically-polymerizable monomer, and
e. an accelerator for curing said organic polymer containing reactive silicon groups;

forming a second liquid B comprising, as its essential component:
c. an initiator for the polymerization of said radically-polymerizable monomer;

maintaining said first liquid A and said second liquid B separate and at temperatures, respectively, such that said component "a" does not polymerize and the reactive silicon in said component "d" does not react to any substantial extent;

mixing said liquids A and B at room temperature to form a mixture;

holding said mixture for up to about 10 minutes at room temperature sufficient to polymerize said component "a", to cure said polymer, and to react said reactive silicon to an extent sufficient form a cured, solid polymeric product; and recovering said cured solid polymeric product.

* * * * *